(12) United States Patent
Nishihata (10) Patent No.: US 8,124,889 B2
(45) Date of Patent: Feb. 28, 2012

(54) ELECTRONIC DEVICE WITH OPENING/CLOSING DOOR

(75) Inventor: Yosuke Nishihata, Osaka (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 399 days.

(21) Appl. No.: 12/555,657

(22) Filed: Sep. 8, 2009

(65) Prior Publication Data
US 2010/0059272 A1   Mar. 11, 2010

(30) Foreign Application Priority Data

Sep. 8, 2008  (JP) .................................. 2008-229223

(51) Int. Cl.
*H01R 13/46* (2006.01)
*H05K 5/00* (2006.01)
*G03B 21/14* (2006.01)
(52) U.S. Cl. ......................................... 174/520; 353/88
(58) Field of Classification Search ................. 174/520; 353/88; 359/738
See application file for complete search history.

(56) References Cited

U.S. PATENT DOCUMENTS

| | | | | |
|---|---|---|---|---|
| 3,632,194 A * | 1/1972 | Myles | ............................ | 352/200 |
| 4,429,963 A * | 2/1984 | Mischenko | ...................... | 353/88 |
| 4,468,720 A * | 8/1984 | Arai | ............................... | 362/281 |
| 5,690,407 A * | 11/1997 | Kikuchi et al. | ................. | 353/88 |
| 7,165,848 B2 * | 1/2007 | Gishi | .............................. | 353/88 |
| 7,204,597 B2 * | 4/2007 | Yang et al. | ....................... | 353/97 |
| 2004/0027539 A1 * | 2/2004 | Plunkett | .......................... | 352/90 |
| 2006/0268232 A1 * | 11/2006 | Jin | .................................. | 352/204 |
| 2009/0174869 A1 * | 7/2009 | Inui et al. | ........................ | 353/91 |

FOREIGN PATENT DOCUMENTS

JP   2006-091588 A   4/2006

* cited by examiner

*Primary Examiner* — Hung Ngo
(74) *Attorney, Agent, or Firm* — Westerman, Hattori, Daniels & Adrian, LLP (57) ABSTRACT

An electronic device with an opening/closing door according to the present invention includes a device body in which an opening is defined, and a shutter system capable of covering and exposing the opening. The shutter system includes a door for covering the opening, an arm, a driving member for driving the arm, and a mounting table having a front surface and a rear surface. The arm and the driving member are arranged on the front surface, and the door is arranged on the rear surface. The door is capable of sliding along the rear surface of the mounting table. The arm has a root end and a front end. The root end is pivotably supported on the front surface of the mounting table at a position closer to one side edge portion of the door than a center line of the width of the door. The front end engages with the other side edge portion of the door without holding the mounting table therebetween.

4 Claims, 9 Drawing Sheets

ELECTRONIC DEVICE WITH OPENING/CLOSING DOOR

The Japanese application Number 2008-229223, upon which this patent application is based, is hereby incorporated by reference.

BACKGROUND OF THE INVENTION

1. Field of the Invention

The present invention relates to an electronic device with an opening/closing door such as an LCD projector including a shutter system.

2. Description of Related Art

In an LCD projector for projecting images onto a screen, there has been a need for temporarily suspending image projection onto the screen while causing a light source for the image projection to stay on. By way of example, in a conventionally used LCD projector, a shutter system constituted by a plurality of shutters is arranged between an optical device with a color synthesizing prism and the like and a light source. The shutter system is closed by rotating the plurality of shutters, thereby temporarily interrupting the passage of light.

The conventionally used LCD projector requires the complicated structure of the shutter system due to the need for rotating the plurality of shutters. In response, a shutter system 100 shown in FIG. 12 has been proposed. The shutter system 100 includes a pair of doors 101 and 102 for interrupting light that respectively move up and down. More specifically, in addition to the pair of doors 101 and 102, the shutter system 100 includes a motor 103, an arm 104, a gear 105 for transmitting the rotation of the motor 103 to the arm 104, and a mounting table 106 for holding these parts thereon. An opening 107 through which light passes is defined in the mounting table 106.

Figure 12:
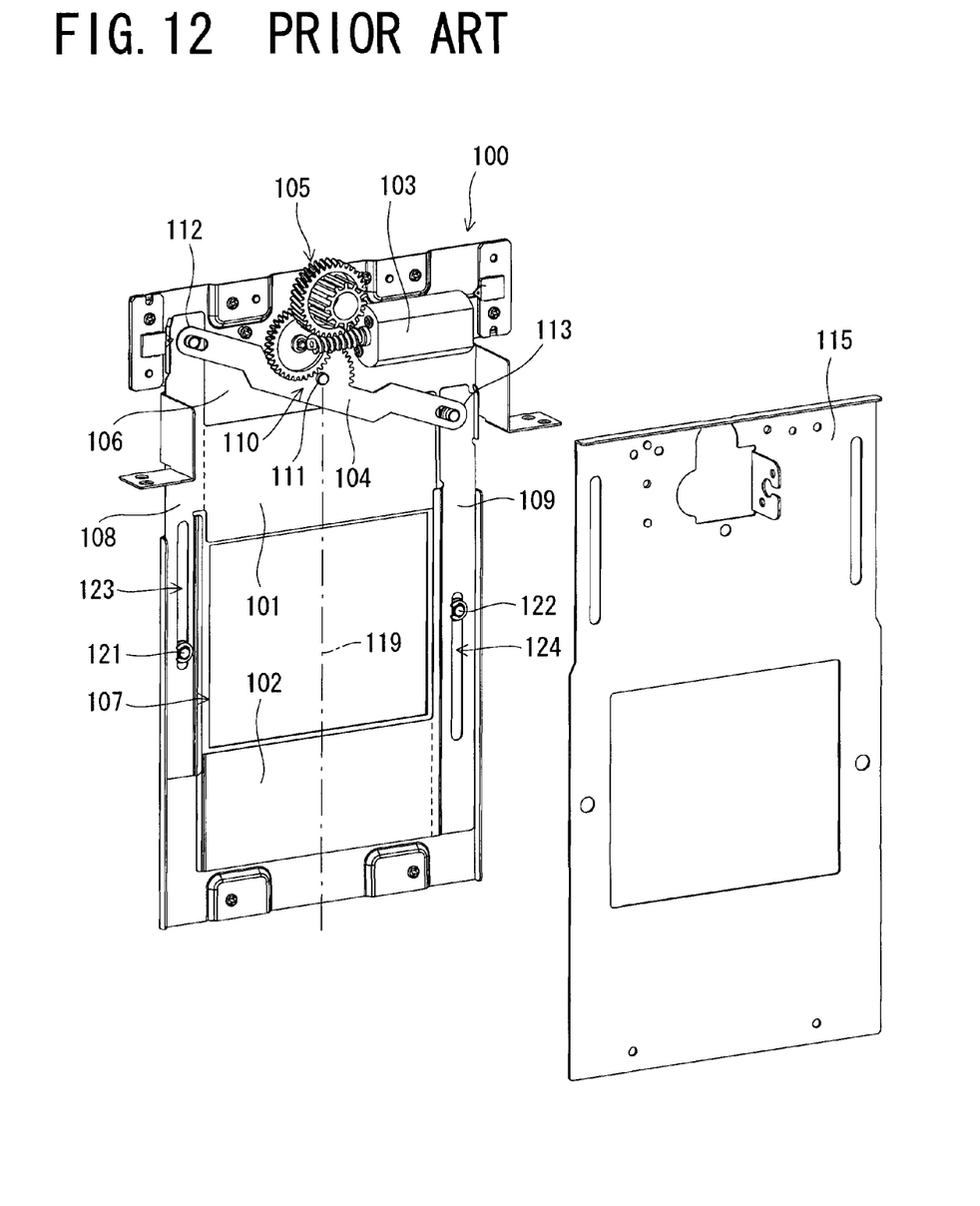
FIG. 12 is an exploded perspective view of a conventionally used shutter system.

The doors 101 and 102 in a pair are arranged above and below the opening 107 respectively, and can slide along a surface of the mounting table 106. More specifically, the doors 101 and 102 in a pair are fixed to sliding plates 108 and 109 respectively that are slidably arranged on opposite sides of the opening 107. When the sliding plates 108 and 109 slide up and down, the doors 101 and 102 in a pair also move (slide) up and down.

The arm 104 is rotatably supported on the mounting table 106. More specifically, the arm 104 is supported at a central part 110 on the mounting table 106. Further, the arm 104 is so arranged that a pivot point 111 of the arm 104 is placed on a center line 119 of the width of the doors 101 and 102. Thus, opposite ends 112 and 113 of the arm 104 are allowed to move about the pivot point 111. More specifically, while the end 112 (113) moves up about the pivot point 111, the end 113 (112) moves down about the pivot point 111. The arm 104 is caused to pivot by transmitting the rotation of the motor 103 through the gear 105 to the arm 104.

The opposite ends 112 and 113 of the arm 104 respectively engage with the sliding plates 108 and 109 in a pair. By fitting projections 121 and 122 provided to the shutter system 100 into holes 123 and 124 defined in the sliding plates 108 and 109 respectively, the sliding plates 108 and 109 are guided so as to move straight up and down. So, the pivotal movement of the arm 104 about the pivot point 111 causes the sliding plate 108 engaging with the end 112 of the arm 104 to slide down, while causing the sliding plate 109 engaging with the end 113 of the arm 104 to slide up. Thus, the door 101 moves down while the door 102 moves up. As a result, the opening 107 is covered with the pair of doors 101 and 102, thereby interrupting light from the light source.

When the arm 104 is caused by the motor 103 to pivot about the pivot point 111 in the opposite direction, the sliding plate 108 engaging with the end 112 of the arm 104 slides up, and the sliding plate 109 engaging with the end 113 of the arm 104 slides down as shown in FIG. 12. Thus, the door 101 moves up while the door 102 moves down. As a result, the opening 107 is exposed so that light from the light source is allowed to pass through the opening 107.

The shutter system 100 including only the pair of doors 101 and 102 has a complicated structure, and a high degree of accuracy is required to smoothly open and close the doors 101 and 102, resulting in high cost of manufacturing the shutter system 100. Further, the pair of doors 101 and 102, and the arm 104 are held on the same surface of the mounting table 106 in the shutter system 100. So, the pair of doors 101 and 102, and the arm 104 should be arranged in a manner that avoids the interference therebetween, resulting in the upsizing of the shutter system 100.

Further, the pair of doors 101 and 102, and the arm 104 held on the mounting table 106 in the shutter system 100 are covered with a cover member 115. So, it is difficult to open and close the doors 101 and 102 by hand when the motor 103 breaks down.

SUMMARY OF THE INVENTION

It is an object of the present invention to provide an electronic device with an opening/closing door including a shutter system capable of smoothly opening and closing a door in spite of its simple and compact structure.

An electronic device with an opening/closing door of a first aspect of the present invention includes a device body in which an opening is defined, and a shutter system capable of covering and exposing the opening. The shutter system includes a door for covering the opening, an arm, a driving member for driving the arm, and a mounting table having a front surface and a rear surface. The arm and the driving member are arranged on the front surface, and the door is arranged on the rear surface. The door is capable of sliding along the rear surface of the mounting table. The arm is so arranged as to overlap the door placed at an open position for exposing the opening, or at a closed position for covering the opening. The arm has a root end and a front end. The root end is pivotably supported on the front surface of the mounting table at a position closer to one side edge portion of the door than a center line of the width of the door. The front end engages with the other side edge portion of the door without holding the mounting table therebetween. The driving member causes the arm to swing about the root end as a pivot point, thereby causing the door to slide along the rear surface of the mounting table.

According to the electronic device with an opening/closing door of the first aspect, the distance from the root end (pivot point) to the front end (point of effort) of the arm engaging with the door is greater than half the width of the shutter system. So, compared to a conventionally used shutter system in which the length of an arm from a pivot point to either end is half the width of the conventionally used shutter system, a ratio of the length of the arm to the width of the shutter system is high. The length of the arm can even be the same as the width of the shutter system according to the position of the pivot point of the arm. Thus, a stroke of the front end of the arm is longer than that in the conventionally used shutter system with the same angle of rotation. As a result, the door moves a longer distance in a sliding direction than in the conventionally used shutter system. So, the opening can be covered and exposed by the single door. Further, the simple structure allows the door to be smoothly opened and closed.

The distance from the root end (pivot point) to the front end (point of effort) of the arm engaging with the door is long. So, when the arm is caused to pivot by hand on the occurrence of breakage of a motor, torque required for the pivotal movement of the arm can be generated by a small control force. As a result, the door can easily be opened and closed by hand.

Still further, the arm is so arranged as to overlap the door placed at the open position or at the closed position. So, the arm and the door do not interfere with each other, by which the shutter system is insusceptible to damage. This arrangement also reduces the size of the shutter system to thereby realize downsizing of the electronic device with an opening/closing door.

According to a second aspect of the electronic device with an opening/closing door of the present invention, in the electronic device with an opening/closing door of the first aspect, the front end of the arm and the other side edge portion of the door are provided with an engagement mechanism including a projection and an engagement hole into which the projection slidably is fitted. The engagement hole extends in a direction oblique to the sliding direction of the door.

In the electronic device with an opening/closing door of the second aspect, the door can move straight in the sliding direction.

According to a third aspect of the electronic device with an opening/closing door of the present invention, in the electronic device with an opening/closing door of the second aspect, the shutter system further includes a cover member for covering the rear surface of the mounting table, and the cover member is provided with a guide for guiding the movement of the door in the sliding direction.

In the electronic device with an opening/closing door of the third aspect, the door is guided by the guide to move, thereby realizing stable opening and closing of the door.

According to a fourth aspect of the electronic device with an opening/closing door, in the electronic device with an opening/closing door of any of the first to third aspects, a tab is provided to the front end of the arm.

In the electronic device with an opening/closing door of the fourth aspect, the arm can easily be operated by hand on the occurrence of breakage of a motor. Further, an operator can recognize a position for holding the arm when the arm is operated by hand.

As described above, in the electronic device with an opening/closing device of the present invention, the door can smoothly be opened and closed in the shutter system in spite of its simple and compact structure.

DETAILED DESCRIPTION OF THE EMBODIMENTS

A preferred embodiment of the present invention is described in detail below with reference to drawings when the present invention is implemented in an LCD projector.

Figure 1:
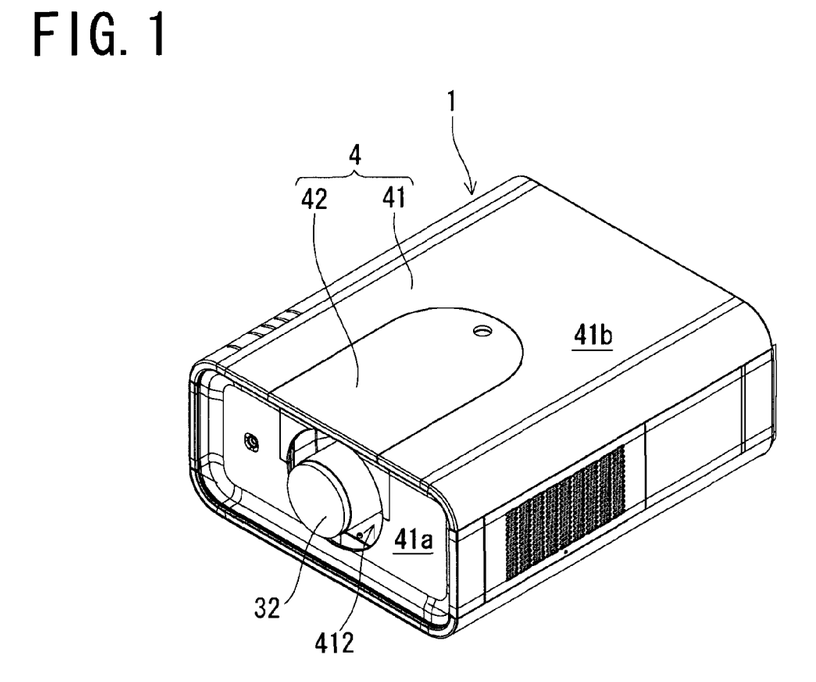
FIG. 1 is a perspective view of an LCD projector according to a preferred embodiment of the present invention.
Figure 2:
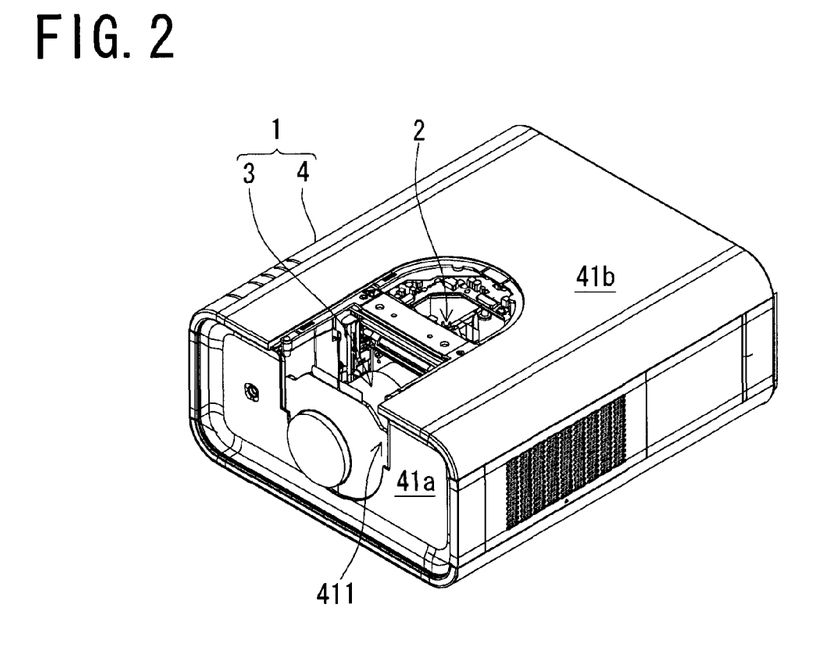
FIG. 2 is a perspective view of the LCD projector when viewed from its front side with a cover detached from the LCD projector.
Figure 3:
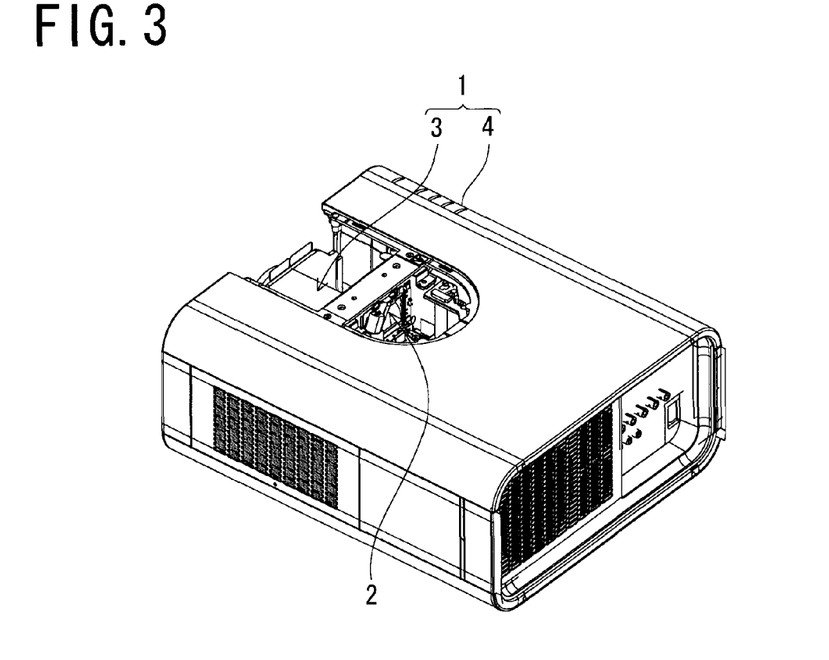
FIG. 3 is a perspective view of the LCD projector when viewed from its rear side with the cover detached from the LCD projector.

An LCD projector according to the preferred embodiment of the present invention is substantially a flattened rectangular parallelepiped in outer appearance as shown in FIG. 1, and includes a device body 1 and a shutter system 2 as shown in FIGS. 2 and 3.

As shown in FIGS. 2 and 3, the device body 1 is constituted by an optical device 3 for generating color images, and a case 4 for storing therein the optical device 3. Although not shown, a light source, and a spectroscope for dividing white light emitted from the light source into three primary colors (red color, green color, blue color) is provided inside the case 4.

As shown in FIG. 1, the case 4 is constituted by a case body 41 and a cover 42. A through hole 411 is so defined in the case body 41 as to extend from a front surface 41a to an upper surface 41b of the case body 41 as shown in FIG. 2. The cover 42 is attached to and detached from the case body 41. When the cover 42 is attached to the case body 41 (FIG. 1), with part 412 of the through hole 411 existing at the front surface 41a remaining exposed in the shape of a circle, the cover 42 covers the remaining part of the through hole 411. The part of the through hole 411 covered with the cover 42 is defined in a manner that allows an operator to reach the shutter system 2 described later by inserting a hand into the case body 41 through this part of the through hole 411.

Figure 4:
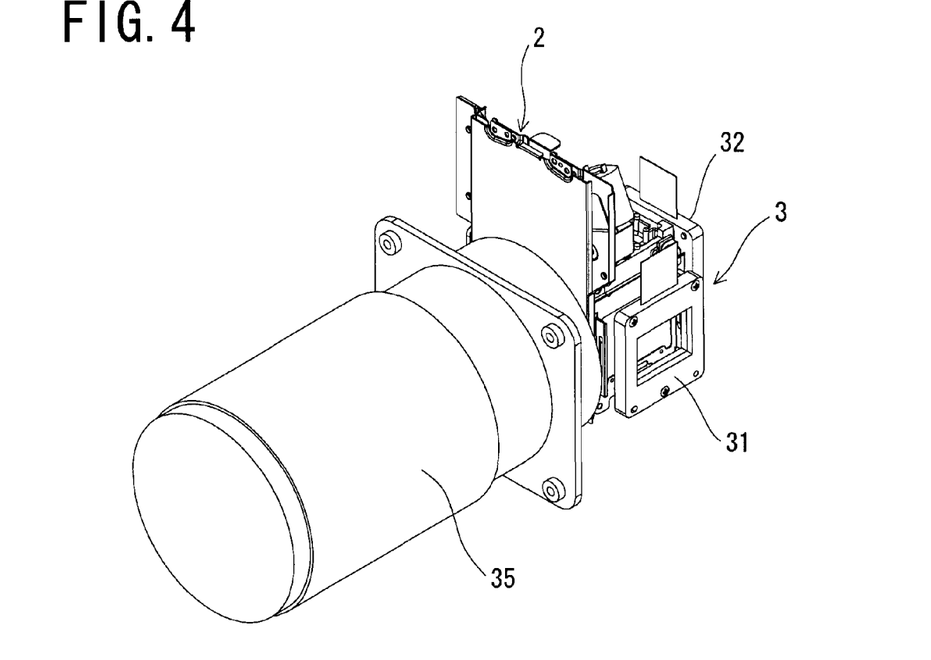
FIG. 4 is a perspective view of an optical device when viewed from its front side.
Figure 5:
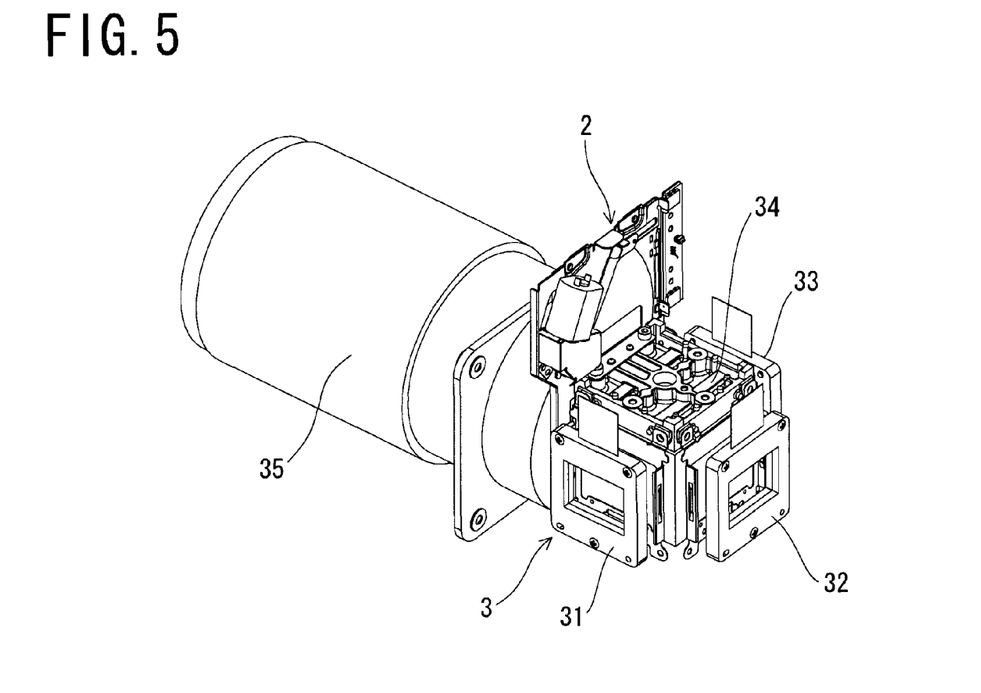
FIG. 5 is a perspective view of the optical device when viewed from its rear side.
Figure 6:
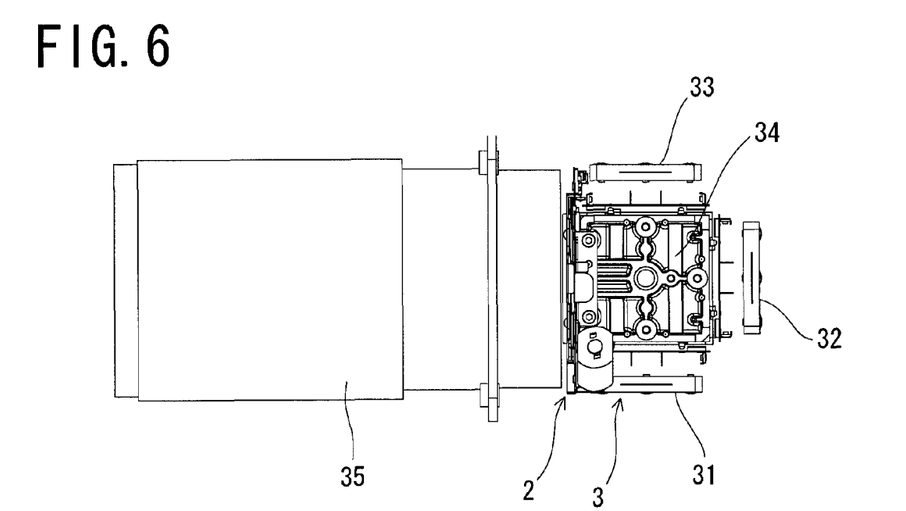
FIG. 6 is a plan view of the optical device.

As shown in FIGS. 4 to 6, the optical device 3 includes a red image generation part 31, a green image generation part 32, a blue image generation part 33, a color synthesizing prism 34, and a projection lens 35. The optical device 3 generates a color image using three primary colors obtained by the above-described spectroscope.

More specifically, the red image generation part 31, the green image generation part 32, and the blue image generation part 33 each have an LCD panel therein. The red image generation part 31 generates a portion of a color image relating to red color (red image) using red light emitted from the spectroscope. The green image generation part 32 generates a portion of the color image relating to green color (green image) using green light emitted from the spectroscope. The blue image generation part 33 generates a portion of the color image relating to blue color (blue image) using blue light emitted from the spectroscope. The images generated by the red image generation part 31, the green image generation part 32 and the blue image generation part 33 enter the color synthesizing prism 34.

Figure 7:
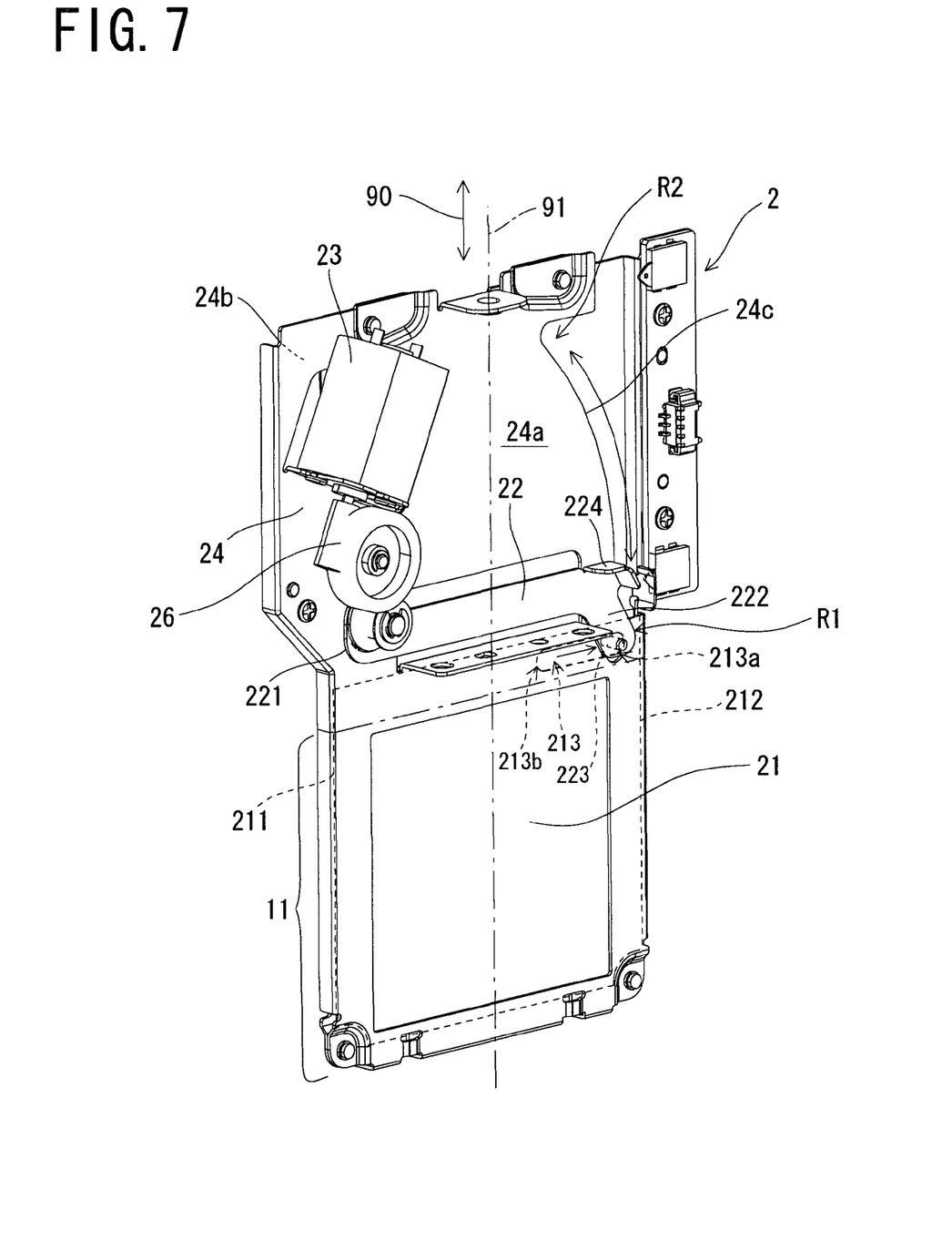
FIG. 7 is a perspective view of a shutter system with an opening closed when viewed from the front surface side of a mounting table.

The color synthesizing prism 34 synthesizes the received images of the three colors to generate one color image. The color image synthesized by the color synthesizing prism 34 is emitted to the projection lens 35. In the LCD projector of the present preferred embodiment, an opening 11 (see FIG. 7) is defined between the color synthesizing prism 34 and the projection lens 35. A color image emitted from the color synthesizing prism 34 passes through the opening 11 to enter the projection lens 35. As shown in FIG. 7, the opening 11 is formed in a mounting table 24 of the shutter system 2 described later, and the mounting table 24 is fixed to the device body 1 (case body 41). So, the opening 11 is regarded as being defined in the device body 1.

The projection lens 35 is so defined as to penetrate the part 412 of the through hole 411 as shown in FIG. 1. The projection lens 35 enlarges a color image generated by the color synthesizing prism 34, and projects the enlarged color image onto a screen arranged in front of the LCD projector.

The shutter system 2 is arranged between the color synthesizing prism 34 and the projection lens 35 as shown in FIGS. 4 to 6. A color image can temporarily be intercepted by covering and exposing the opening 11. That is, by temporarily intercepting a color image emitted from the color synthesizing prism 34 toward the projection lens 35, the shutter system 2 can temporarily suspend the image projection onto the screen while causing the light source to stay on. The structure of the shutter system 2 is described in more detail below.

Figure 8:
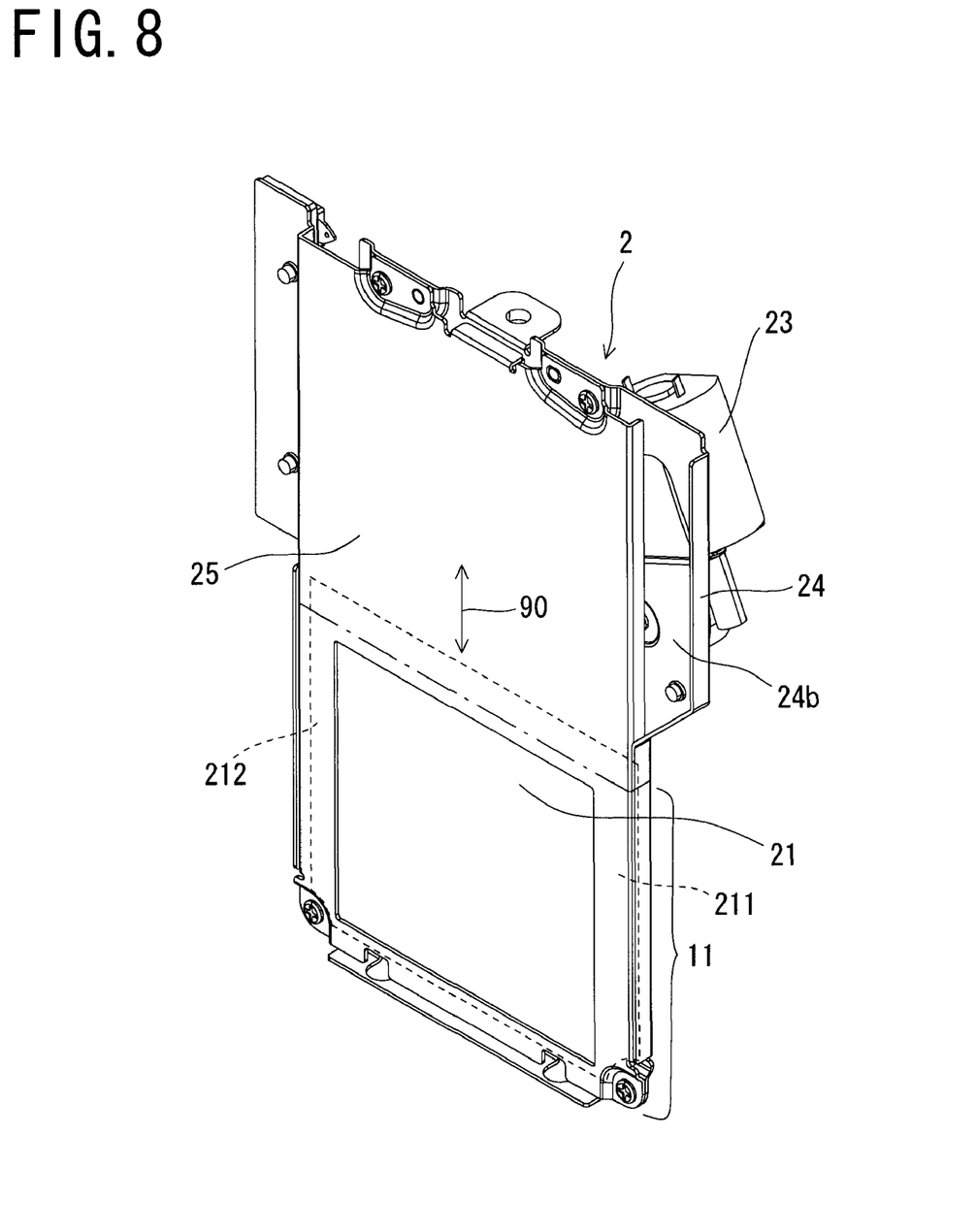
FIG. 8 is a perspective view of the shutter system with the opening closed when viewed from the rear surface side of the mounting table.
Figure 9:
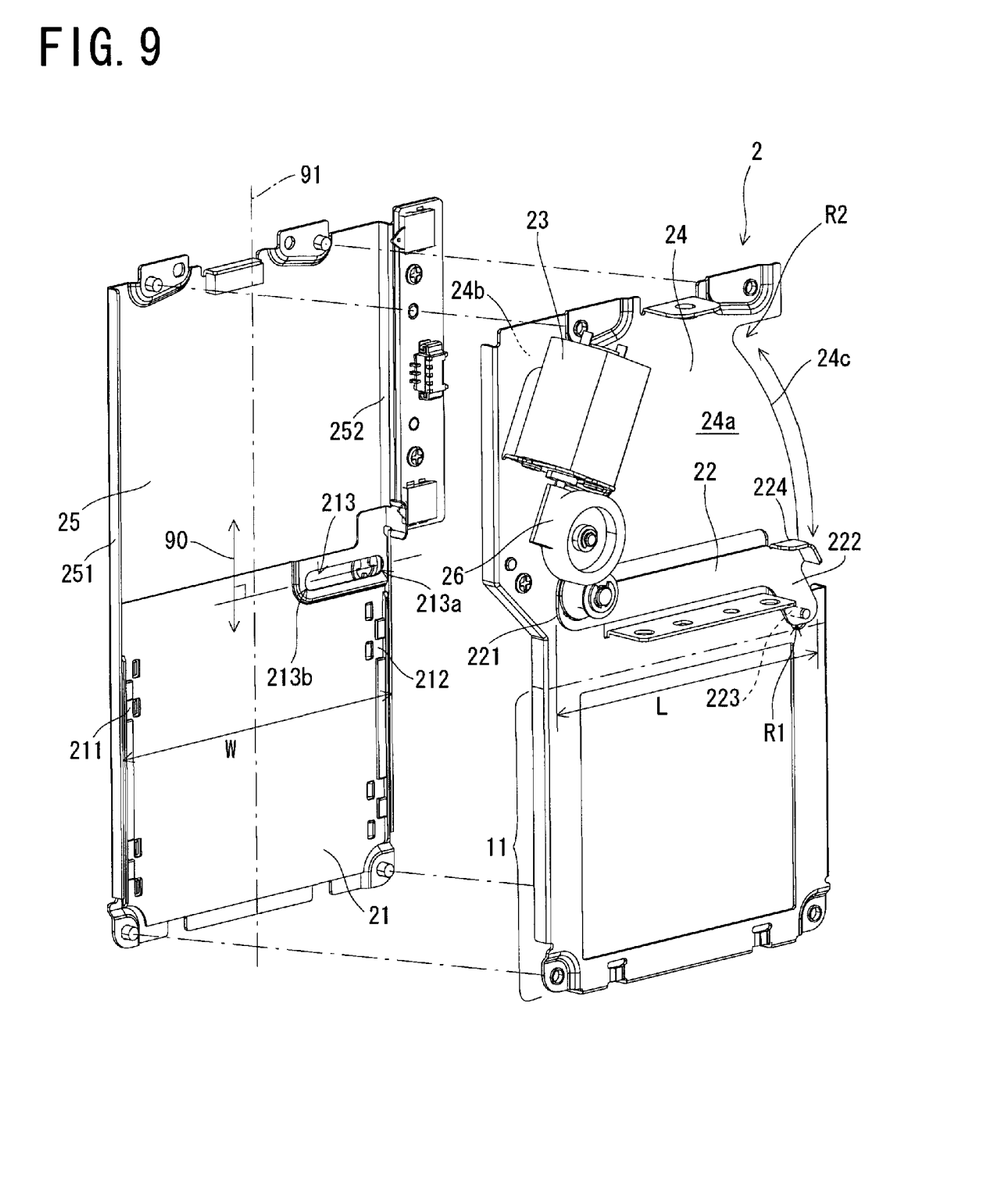
FIG. 9 is an exploded perspective view of the shutter system with the opening closed.

As shown in FIGS. 7 to 9, the shutter system 2 includes a door 21, an arm 22, a motor 23, a mounting table 24, a cover member 25, and a gear 26. The arm 22 and the motor 23 are arranged on a front surface 24a of the mounting table 24. The door 21 is arranged on a rear surface 24b of the mounting table 24. Although not shown, the mounting table 24 is fixed to the case body 41.

The door 21 can slide up and down along the rear surface 24b of the mounting table 24 as shown in FIGS. 8 and 9. The door 21 covers and exposes the opening 11 to temporarily intercept a color image. The rear surface 24b of the mounting table 24 is covered with the cover member 25 as shown in FIG. 8, and the door 21 slides in a gap between the mounting table 24 and the cover member 25.

As shown in FIG. 9, the cover member 25 is provided with guides 251 and 252 for guiding the movement of the door 21 in a sliding direction 90. Thus, the door 21 is guided by the guides 251 and 252 so that the door 21 moves straight in the sliding direction 90.

The arm 22 is pivotably supported on the front surface 24a of the mounting table 24. More specifically, a root end 221 of the arm 22 is pivotably supported on the front surface 24a of the mounting table 24 at a position near the opening 11, and closer to a side edge portion 211 of the door 21 than a center line 91 of the width of the door 21, as shown in FIGS. 7 to 9. A length L of the arm 22 is approximately the same as a width W of the door 21 as shown in FIG. 9. The center line 91 is a center line of the door 21, or of the shutter system 2.

Accordingly, the arm 22 can swing along the front surface 24a of the mounting table 24 about the root end 221 as a pivot point. Further, a front end 222 of the arm 22 can move back and forth along an orbit about the pivot point, and between a position R1 near the opening 11 and closer to a side edge portion 212 of the door 21 than the center line 91 and a position R2 near an upper edge of the front surface 24a of the mounting table 24. The arm 22 is caused to pivot about the pivot point by transmitting the rotation of the motor 23 through the gear 26 to the root end 221.

An edge 24c of the mounting table 24 arcuately extends along the orbit of the front end 222 about the pivot point (root end 221). Further, the front end 222 engages with the side edge portion 212 of the door 21 at a position outside the edge 24c of the mounting table. That is, the front end 222 of the arm 22 engages with the side edge portion 212 of the door 21 without holding the mounting table 24 therebetween.

More specifically, as shown in FIG. 7 (or FIG. 10), the front end 222 of the arm 22 and the side edge portion 212 of the door 21 are provided with an engagement mechanism including a projection 223 and an engagement hole 213 into which the projection 223 is slidably fitted. In more detail, the projection 223 is provided to the front end 222 of the arm 22, and the engagement hole 213 is provided to the side edge portion 212 of the door 21. The engagement hole 213 extends in a direction perpendicular to the sliding direction 90 of the door 21.

According to the above-described structures of the door 21 and the arm 22, by causing the arm 22 to pivot about the pivot point to move the front end 22 to the position R1, the door 21 slides toward the opening 11 as shown in FIG. 7 (or FIG. 9). At this time, of ends 213a and 213b of the engagement hole 213, the projection 223 slides toward the end 213a farther from the center line 91 as shown in FIG. 7. Thus, the door 21 is guided by the guides 251 and 252 so that the door 21 can move straight in the sliding direction 90. As a result, the opening 11 is covered with the door 21.

Figure 10:
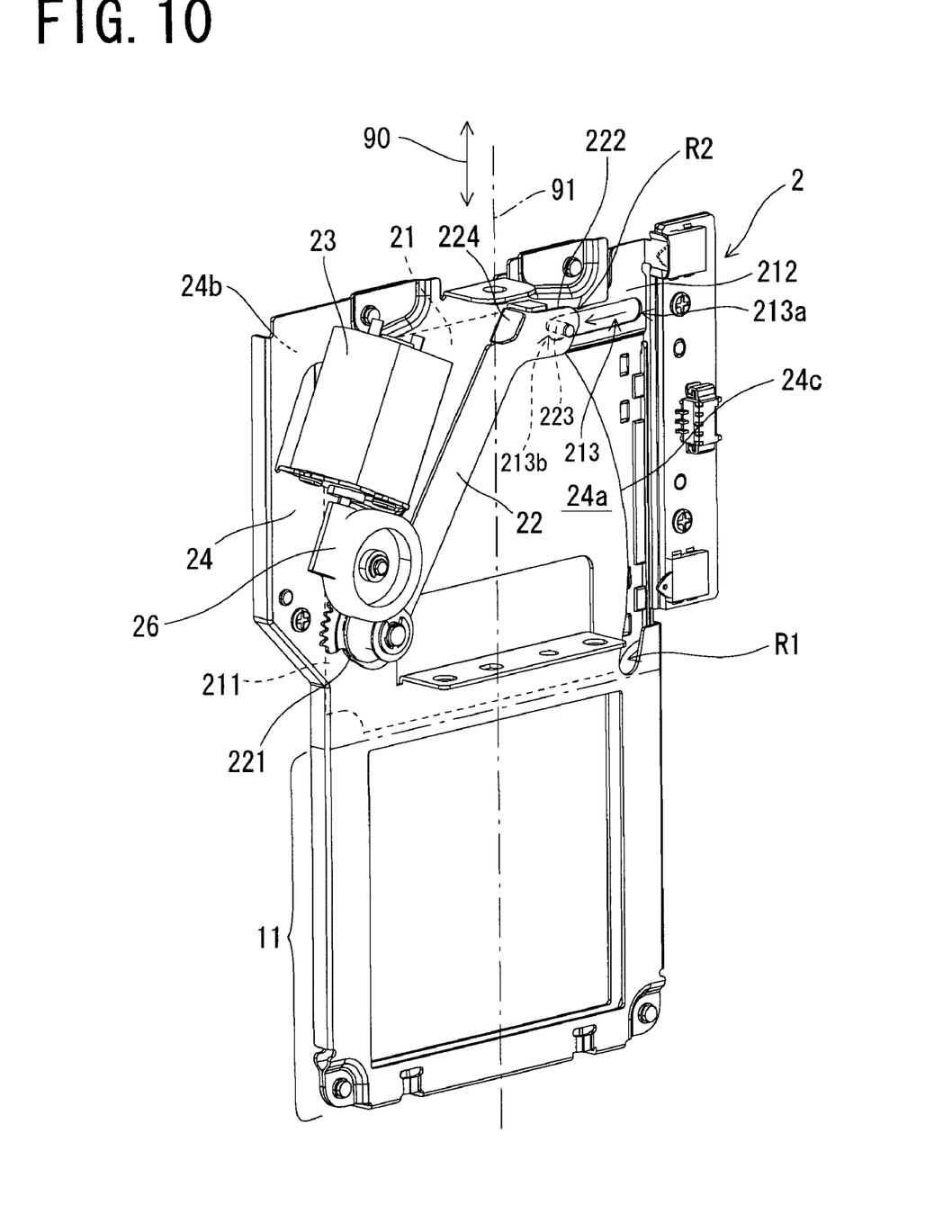
FIG. 10 is a perspective view of the shutter system with the opening open when viewed from the front surface side of the mounting table.
Figure 11:
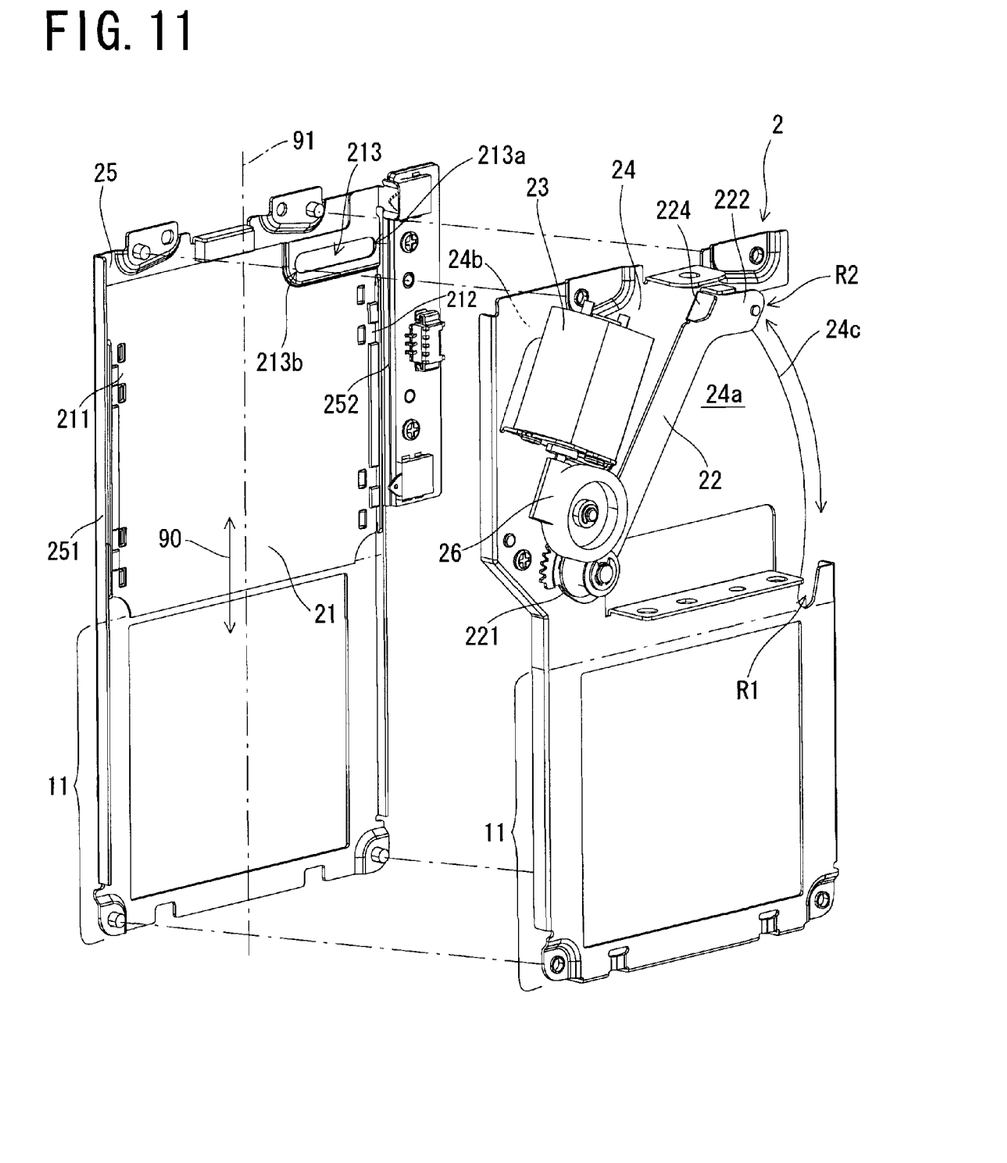
FIG. 11 is an exploded perspective view of the shutter system with the opening open.

In contrast, by causing the arm 22 to pivot about the pivot point to move the front end 222 to the position R2, the door 21 slides to reach a position overlapping the rear surface 24b of the mounting table 24, in other words, the position overlapping the arm 22 as shown in FIG. 10 (or FIG. 11). At this time, the projection 223 slides toward the end 213b closer to the center line 91 as shown in FIG. 10. Thus, the door 21 is guided by the guides 251 and 252 so that the door 21 can move straight in the sliding direction 90. As a result, the opening 11 is exposed.

According to the LCD projector described above, the distance from the root end 221 (pivot point) to the front end 222 (point of effort) of the arm 22, namely the length L of the arm 22 is greater than half the width W of the shutter system 2. So, compared to the conventionally used shutter system (FIG. 12) in which the length of the arm from the pivot point to either end is half the width of the shutter system 100, a ratio of the length of the arm to the width of the shutter system can be higher. Thus, provided that the same width of the shutter system is given, a stroke of the front end 222 of the arm 22 is longer than that in the conventionally used shutter system with the same angle of rotation.

Thus, the door 21 moves a longer distance in the sliding direction 90 than in the conventionally used shutter system. So, like the LCD projector of the present preferred embodiment, the opening 11 can be covered and exposed by the single door 21. The shutter system 2 including the single door 21 can be applied for example to an LCD projector in which the door 21 may be held on only one side of the opening 11. Further, the simple structure of the shutter system 2 allows the door 21 to be smoothly opened and closed.

Still further, the arm 22 is arranged on the front surface 24a, and the door 21 is arranged on the rear surface 24b of the mounting table 24. Thus, the door 21 and the arm 22 do not interfere with each other for opening and closing the door 21, by which the shutter system 2 is insusceptible to damage. The arm 22 and the door 21 are so arranged as to overlap each other when the door 21 is placed at an open position for exposing the opening 11 (see FIGS. 10 and 11). This reduces the size of the shutter system 2 to thereby realize downsizing of the LCD projector.

Further, the door 21 and the arm 22 engage with each other by the engagement mechanism (including the projection 223 and the engagement hole 213). Thus, the door 21 can stably move straight in the sliding direction 90.

In the LCD projector described above, the distance from the root end 221 (pivot point) to the front end 222 (point of effort) of the arm 22 is long. So, when the arm 22 is caused to pivot by hand on the occurrence of breakage of the motor 23, torque required for the pivotal movement of the arm 22 can be generated by a small control force. As a result, the door 21 can easily be opened and closed by hand.

From this point of view, the LCD projector of the present preferred embodiment has a tab 224 provided at the front end 222 of the arm 22 as shown in FIG. 7. Thus, the arm 22 can easily be operated by hand, and an operator can recognize a position for holding the arm 22 when the arm 22 is operated by hand. The cover 42 is detached from the case body 41 as shown in FIG. 3 when the arm 22 is caused to pivot by hand.

In the LCD projector described above, the arm 22 is so arranged as to overlap the door 21 placed at the open position for exposing the opening 11. Alternatively, the arm 22 may be so arranged as to overlap the door 21 placed at a closed position for covering the opening 11. More specifically, the opening 11 is defined on the upper side of the holding table 24 in the above-described shutter system 2. This structure also achieves the same effect as obtained by the above-described LCD projector.

In the LCD projector described above, the projection 223 constituting the engagement mechanism is provided to the front end 222 of the arm 22, and the engagement hole 213 is provided to the side edge portion 212 of the door 21. Alternatively, the projection 223 may be provided to the side edge portion 212 of the door 21, and the engagement hole 213 may be provided to the front end 222 of the arm 22.

In the LCD projector described above, the engagement hole 213 extends in a direction perpendicular to the sliding direction 90. The engagement hole 213 may alternatively extend in a direction oblique to the sliding direction 90.

The engagement mechanism of this structure also allows the door 21 to stably move straight in the sliding direction 90.

The structure of each part of the present invention is not limited to that shown in the preferred embodiment described above. Various modifications may be devised within the technical scope defined in claims. Further, the present invention may be implemented not only in an LCD projector, but also in an electronic device with an opening/closing door of various types including a device body in which an opening is defined, and a shutter system capable of covering and exposing the opening.

The invention claimed is:

1. An electronic device with an opening/closing door comprising a device body in which an opening is defined, and a shutter system capable of covering and exposing the opening, the shutter system including a door for covering said opening, an arm, a driving member for driving the arm, and a mounting table having a front surface and a rear surface, said arm and said driving member being arranged on the front surface, said door being arranged on the rear surface, said door being capable of sliding along the rear surface of the mounting table, said arm being so arranged as to overlap said door placed at an open position for exposing said opening, or at a closed position for covering said opening, said arm having a root end and a front end, the root end being pivotably supported on the front surface of said mounting table at a position closer to one side edge portion of said door than a center line of the width of the door, the front end engaging with the other side edge portion of said door without holding said mounting table therebetween, said driving member causing said arm to swing about said root end as a pivot point, thereby causing said door to slide along the rear surface of the mounting table.

2. The electronic device with an opening/closing door according to claim 1, wherein the front end of said arm and the other side edge portion of said door are provided with an engagement mechanism including a projection and an engagement hole into which the projection is slidably fitted, said engagement hole extending in a direction oblique to a sliding direction of said door.

3. The electronic device with an opening/closing door according to claim 2, wherein said shutter system further includes a cover member for covering the rear surface of said mounting table, and the cover member is provided with a guide for guiding the movement of said door in the sliding direction.

4. The electronic device with an opening/closing door according to claim 1, wherein a tab is provided to the front end of said arm.

* * * * *